(12) United States Patent
Chang

(10) Patent No.: US 8,409,001 B2
(45) Date of Patent: Apr. 2, 2013

(54) COMPUTER SYSTEM AND CONTROLLING METHOD THEREOF

(75) Inventor: Yao-Yuan Chang, Tucheng (TW)

(73) Assignee: Industrial Technology Research Institute, Hsinchu (TW)

( * ) Notice: Subject to any disclaimer, the term of this patent is extended or adjusted under 35 U.S.C. 154(b) by 430 days.

(21) Appl. No.: 12/575,771

(22) Filed: Oct. 8, 2009

(65) Prior Publication Data

US 2010/0105476 A1    Apr. 29, 2010

(30) Foreign Application Priority Data

Oct. 27, 2008  (TW) ............................... 97141193 A
Aug. 19, 2009  (TW) ............................... 98127889 A

(51) Int. Cl.
*A63F 13/00* (2006.01)

(52) U.S. Cl. ................ 463/34; 463/30; 463/31; 463/32; 463/33

(58) Field of Classification Search ............ 463/30, 463/31, 32, 33, 34, 42
See application file for complete search history.

(56) References Cited

U.S. PATENT DOCUMENTS

| | | | | |
|---|---|---|---|---|
| 5,013,278 | A | * | 5/1991 | Dixon et al. ................ 446/73 |
| 5,394,202 | A | * | 2/1995 | Deering ....................... 353/7 |
| 5,548,694 | A | * | 8/1996 | Frisken Gibson ............ 345/424 |
| 6,545,663 | B1 | * | 4/2003 | Arbter et al. ................ 345/158 |
| 7,023,436 | B2 | | 4/2006 | Segawa et al. |
| 7,724,250 | B2 | | 5/2010 | Ishii et al. |
| 2003/0117402 | A1 | * | 6/2003 | Hubrecht et al. .......... 345/473 |
| 2004/0109009 | A1 | * | 6/2004 | Yonezawa et al. ......... 345/632 |
| 2004/0130579 | A1 | * | 7/2004 | Ishii et al. ................. 345/848 |
| 2007/0178955 | A1 | * | 8/2007 | Mills ........................ 463/13 |
| 2009/0215536 | A1 | * | 8/2009 | Yee et al. .................. 463/42 |
| 2009/0244097 | A1 | * | 10/2009 | Estevez ..................... 345/633 |

FOREIGN PATENT DOCUMENTS

| | | |
|---|---|---|
| CN | 1858677 | 11/2006 |
| CN | 1293519 | 1/2007 |
| JP | 2001-307134 | 11/2001 |
| JP | 2002-230057 | 8/2002 |

OTHER PUBLICATIONS

English language translation of abstract of CN 1858677 (published Nov. 8, 2006).
English language translation of abstract of CN 1293519 (published Jan. 3, 2007).
Japanese language Notice of Allowance dated Jan. 10, 2012.
English language translation of abstract of JP 2001-307134 (published Nov. 2, 2001).
English language translation of abstract of JP 2002-230057 (published Aug. 16, 2002).

* cited by examiner

*Primary Examiner* — James S McClellan

(74) *Attorney, Agent, or Firm* — McClure, Qualey & Rodack, LLP

(57) ABSTRACT

A computer system and a controlling method are provided. The computer system includes a container and a display unit. The container has an opening through which a real article enters the container. The display unit displays a frame. The controlling method of the computer system includes the following steps. A first fictitious role corresponding to the real article is obtained. A space characteristic of the real article corresponding to the container is obtained. A first displaying characteristic of the real article corresponding to the frame is obtained according to the first fictitious role and the space characteristic. A first fictitious object is displayed on the frame according to the first displaying characteristic.

34 Claims, 14 Drawing Sheets

COMPUTER SYSTEM AND CONTROLLING METHOD THEREOF

This application claims the benefit of Taiwan application Serial No. 97141193, filed Oct. 27, 2008, and Taiwan application Serial No. 98127889, filed Aug. 19, 2009, the subject matter of which is incorporated herein by reference.

BACKGROUND OF THE INVENTION

1. Field of the Invention

The invention relates in general to a computer system and a controlling method thereof, and more particularly to a computer system for processing a fictitious object according to a real article, and a controlling method thereof.

2. Description of the Related Art

The typical frame interaction is achieved through a joystick, a mouse or a keyboard, and the operator's commands and the desired actions are accomplished by a menu interface of the software. The operator has to click the complicated steps using the mouse, or to remember and press the hot keys of the keyboard.

This operating method is very strange to most operators and has a relative degree of threshold. Thus, the current application of the frame interaction is only adapted to the youth's interactive game, and is rarely applied to the infant's interaction course material or the entertainment of the older persons.

SUMMARY OF THE INVENTION

The invention is directed to a computer system and a controlling method thereof, wherein detecting and controlling procedures are used such that the computer system can completely respond to the position, size and angle of the real article in the fictitious frame and the feeling of reality of the fictitious reality can be enhanced. In addition, the real article can also interact with the fictitious object displayed in the frame to increase a lot of interests.

According to a first aspect of the present invention, a controlling method of a computer system is provided. The computer system includes a container and a display unit. The container has an opening through which a real article enters the container. The display unit displays a frame. The controlling method includes the steps of: obtaining a first fictitious role corresponding to the real article; obtaining a space characteristic of the real article corresponding to the container; obtaining a first displaying characteristic of the real article corresponding to the frame according to the first fictitious role and the space characteristic; and displaying a first fictitious object on the frame according to the first displaying characteristic.

According to a second aspect of the present invention, a computer system is provided. The computer system includes a container, a display unit, a data unit and a control unit. The container has an opening, through which a real article enters the container. The display unit displays a frame. The data unit obtains a first fictitious role corresponding to the real article, and obtains a space characteristic of the real article corresponding to the container. The control unit obtains a first displaying characteristic of the real article corresponding to the frame according to the first fictitious role and the space characteristic, and displays a first fictitious object on the frame according to the first displaying characteristic.

The invention will become apparent from the following detailed description of the preferred but non-limiting embodiments. The following description is made with reference to the accompanying drawings.

DETAILED DESCRIPTION OF THE INVENTION

First Embodiment

Figure 1A:
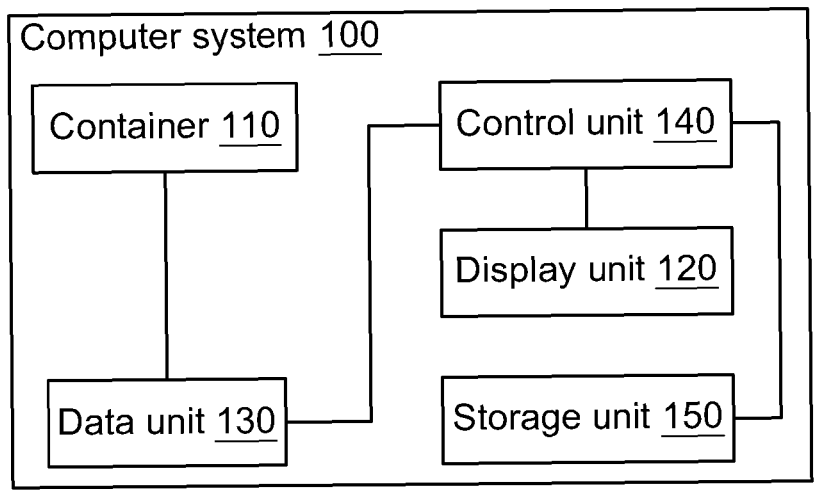
FIG. 1A is a block diagram showing a computer system according to a first embodiment of the invention.
Figure 1B:
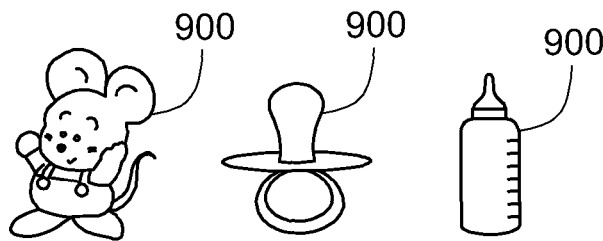
FIG. 1B is a schematic illustration showing a real article, a container and a display unit.
Figure 1B:
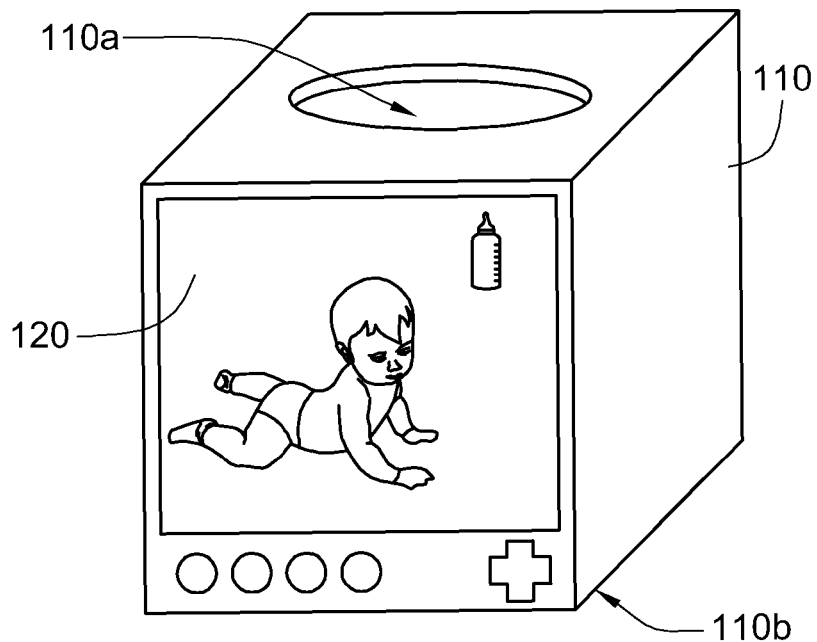
Figure 1C:
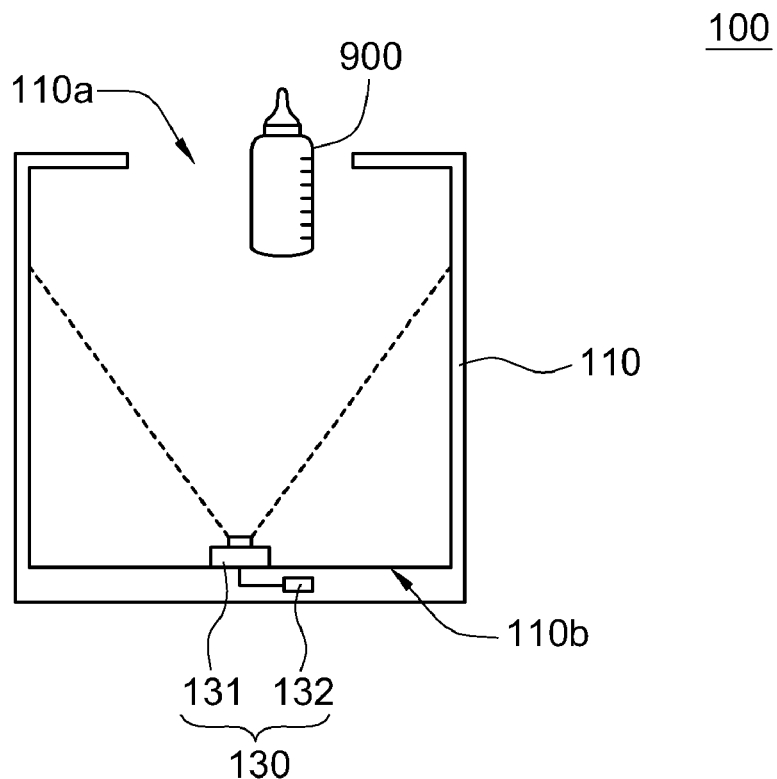
FIG. 1C is a schematic illustration showing a data unit of FIG. 1A.

FIG. 1A is a block diagram showing a computer system 100 according to a first embodiment of the invention. FIG. 1B is a schematic illustration showing a real article 900, a container 110 and a display unit 120. FIG. 1C is a schematic illustration showing a data unit 130 of FIG. 1A. Referring to FIGS. 1A to 1C, the computer system 100 includes the container 110, the display unit 120, the data unit 130, a control unit 140 and a storage unit 150. The container 110 includes, for example, a box-like hollow structure, a flat hollow structure or a rod-like hollow structure. In this embodiment, the container 110 is a box-like hollow structure. The container 110 has an opening 110a and a bottom 110b corresponding to the opening 110a. The real article 900 may enter the container 110 through the opening 110a.

The display unit 120 displays a frame. The display unit 120 may be, for example, a liquid crystal display (LCD) screen or a cathode ray tube (CRT) screen. In this embodiment, the display unit 120 and the container 110 are integrated as a one-piece molded structure.

The data unit 130 obtains a first fictitious role corresponding to the real article 900. The first fictitious role may be, for example, the role of a feeding bottle, a baby bear, a hook, a puppy or a palm. The data unit 130 obtains a space characteristic of the real article 900 corresponding to the container 110. The space characteristic may include, for example, a spatial position and a rotation angle. The spatial position includes, for example, a height or a horizontal position of the real article 900, and the rotation angle includes, for example, the rotation angle of the real article 900. In this embodiment, the data unit 130 includes an image capturer 131 (depicted in FIG. 1C) and an image analyzer 132 (depicted in FIG. 1C).

The control unit 140 obtains a first displaying characteristic of the real article 900 corresponding to the frame according to the first fictitious role and the space characteristic. The first displaying characteristic includes, for example, a first displaying position, a first displaying size, a first moving direction and a first moving rate. The control unit 140 also displays a first fictitious object on the frame according to the first displaying characteristic.

Figure 2:
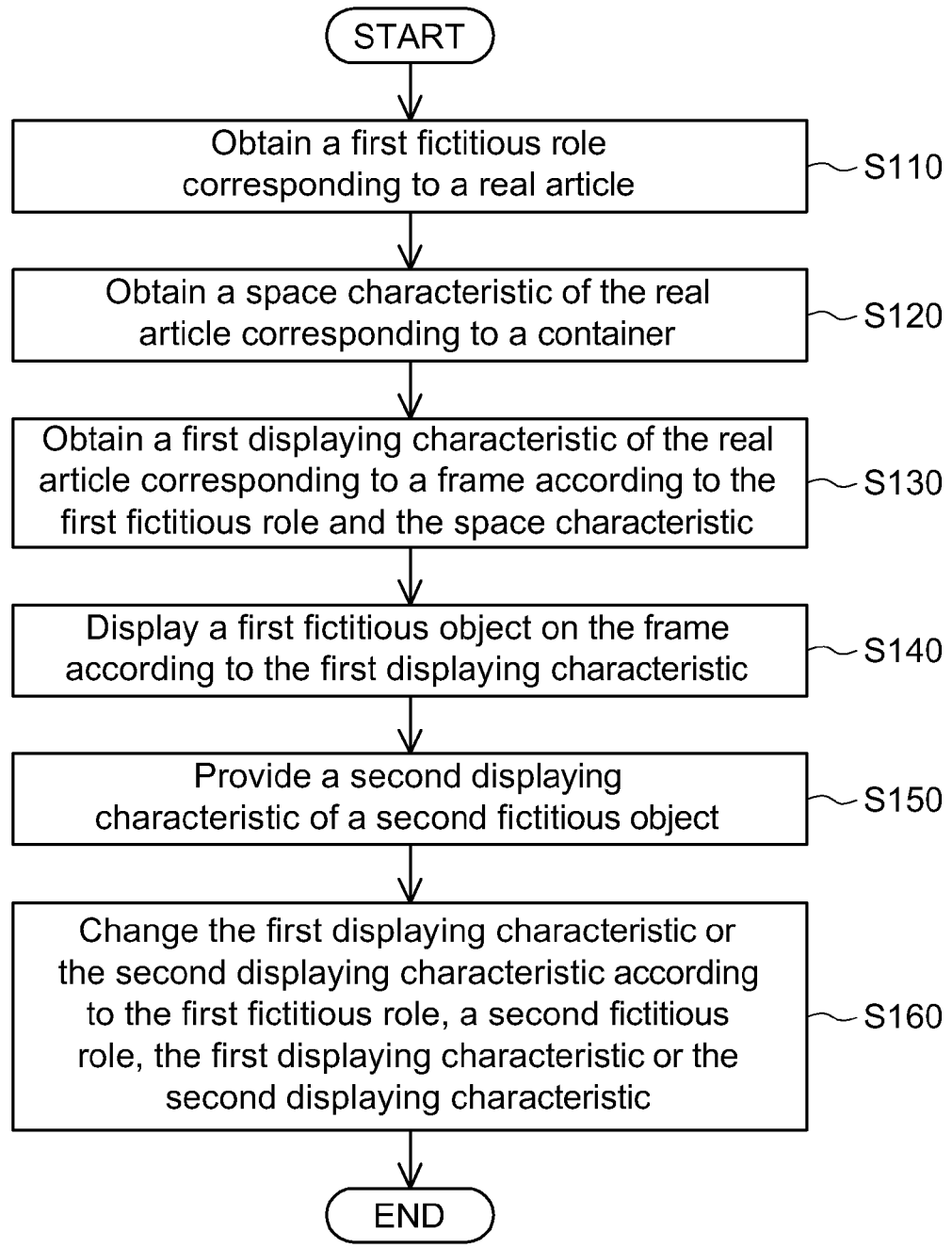
FIG. 2 is a flow chart showing a controlling method of the computer system according to the invention.

The controlling method of the computer system 100 according to this embodiment of the invention will further be described with reference to a flow chart. FIG. 2 is a flow chart showing a controlling method of the computer system 100 according to the invention. Referring to FIGS. 1A to 2, the controlling method includes the following steps. First, in step S110, the data unit 130 obtains the first fictitious role corresponding to the real article 900. In this embodiment, the computer system 100 recognizes the real article 900 to obtain the first fictitious role. The method of recognizing the first fictitious role is performed by way of image recognition.

Figure 3:
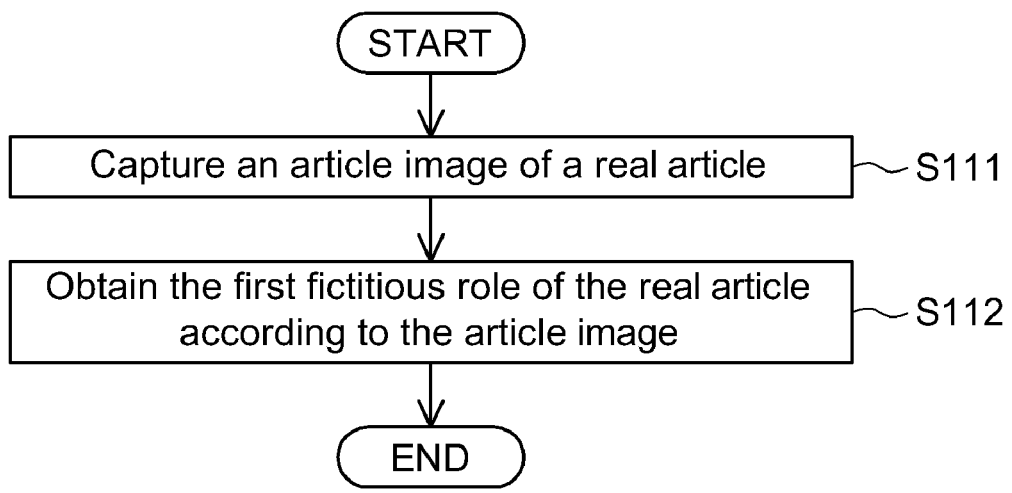
FIG. 3 is a detailed flow chart showing step S110 of FIG. 2.

FIG. 3 is a detailed flow chart showing the step S110 of FIG. 2. The step S110 of this embodiment includes steps S111 and S112. In the step S111, the image capturer 131 captures an article image of the real article 900. Next, in the step S112, the image analyzer 132 obtains the first fictitious role of the real article 900 according to the article image. For example, the storage unit 150 has stored a look-up table of the image data and the fictitious role in advance. The image analyzer 132 may determine the fictitious role, to which the article image pertains, from the look-up table by way of comparison. If the suitable fictitious role cannot be found from the look-up table, a new fictitious role may also be directly defined.

Next, in step S120, the data unit 130 obtains the space characteristic of the real article 900 corresponding to the container 110. In this embodiment, the data unit 130 detects the real article 900 to obtain the space characteristic of the real article 900, which includes the height and the horizontal position of the real article 900 relative to a bottom 100b.

Figure 4:
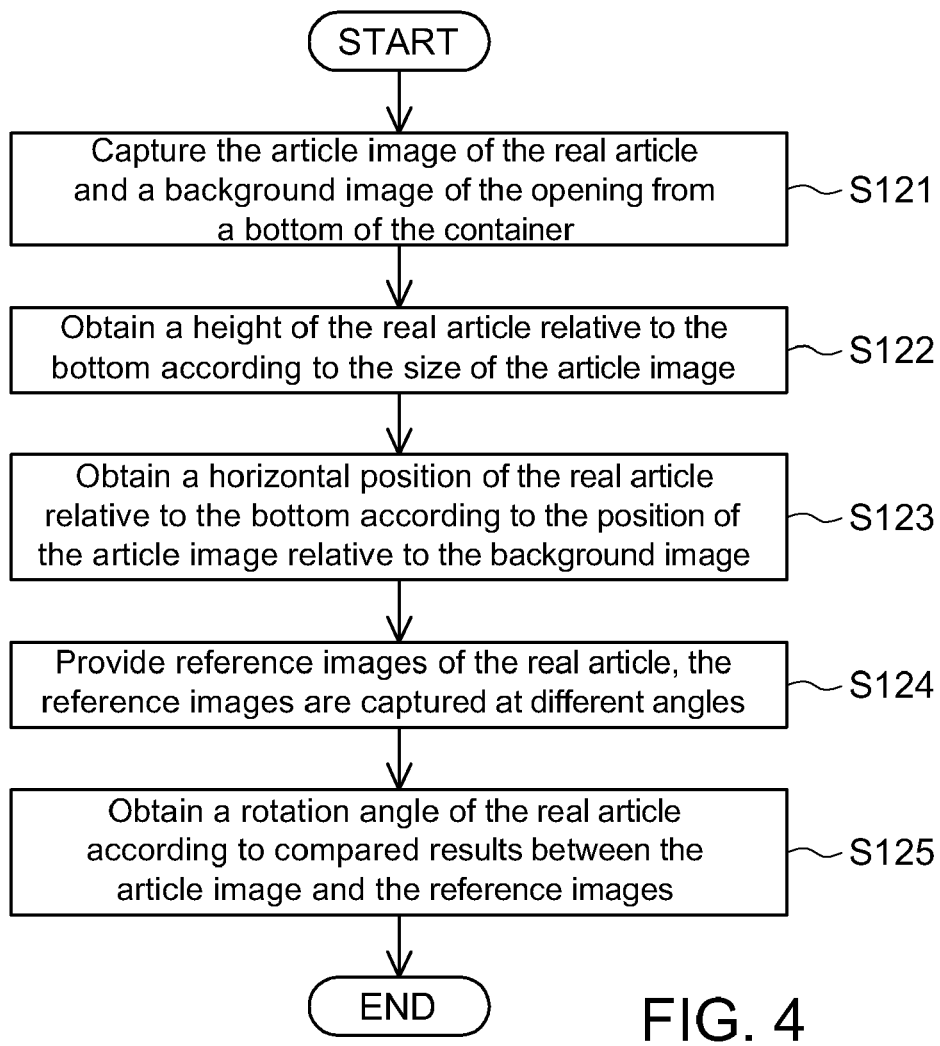
FIG. 4 is a detailed flow chart showing step S120 of FIG. 2.

FIG. 4 is a detailed flow chart showing the step S120 of FIG. 2. In this embodiment, the step S120 includes steps S121 to S125. In the step S121, the image capturer 131 captures the article image of the real article 900 and a background image of the opening 110a from the bottom 110b of the container 110.

Next, in the step S122, the image analyzer 132 obtains the height of the real article 900 relative to the bottom 110b according to the size of the article image. For example, the larger article image represents the smaller height of the real article 900 relative to the bottom 110b, and the smaller article image represents the greater height of the real article 900 relative to the bottom 110b.

Then, in the step S123, the image analyzer 132 judges the horizontal position of the real article 900 relative to the bottom 110b according to the position of the article image relative to the background image. For example, when the position of the article image relative to the background image is close to the upper left corner, it represents that the horizontal position of the real article 900 relative to the bottom 110b is close to the rear left side.

Next, in the step S124, the storage unit 150 provides several reference images of the real article 900, wherein the reference images, such as six images corresponding to the top, bottom, left, right, front and rear points of views, are captured at different angles.

Then, in the step S125, the image analyzer 132 obtains the rotation angle of the real article 900 according to the compared results between the article image and the reference images. The rotation angle may be any angle ranging from 0 to 360 degrees in the three-dimensional space. For example, when the article image covers a greater ratio of the left-side image and the smaller ratio of the front-side image, it represents that the rotation angle of the real article 900 is biased to the left side.

Next, in step S130, the control unit 140 obtains the first displaying characteristic of the real article 900 corresponding to the frame according to the first fictitious role of the real article 900 and the space characteristic. For example, referring to Table 1, the control unit 140 respectively obtains various first displaying characteristics according to the first fictitious role of the real article 900 and the space characteristic.

TABLE 1

| Real Article | | | First Fictitious Object | |
|---|---|---|---|---|
| First fictitious role | | Feeding bottle | First displaying characteristic | Display a pattern of the feeding bottle |
| Space characteristic | Relative height | Higher position | | Position wherein the frame is higher |
| | Relative horizontal position | Close to the rear right side | | Reduced and biased rightwards |
| | Rotation angle | Front side | | Display a pattern of the front side |

Then, in the step S140, the control unit 140 displays the first fictitious object on the frame according to the first displaying characteristic. Taking Table 1 and FIG. 1B as an example, the control unit 140 displays the reduced pattern of the front side of the feeding bottle on the frame, and the pattern of the feeding bottle is displayed at the position closed to the upper right side of the frame.

Next, in the step S150, the storage unit 150 provides a second fictitious role and a second displaying characteristic of a second fictitious object displayed on the frame. As shown in FIG. 1B, the second fictitious object is an infant pattern.

Then, in the step S160, the first displaying characteristic or the second displaying characteristic is changed according to the first fictitious role, the second fictitious role, the first displaying characteristic or the second displaying characteristic.

Figure 5:
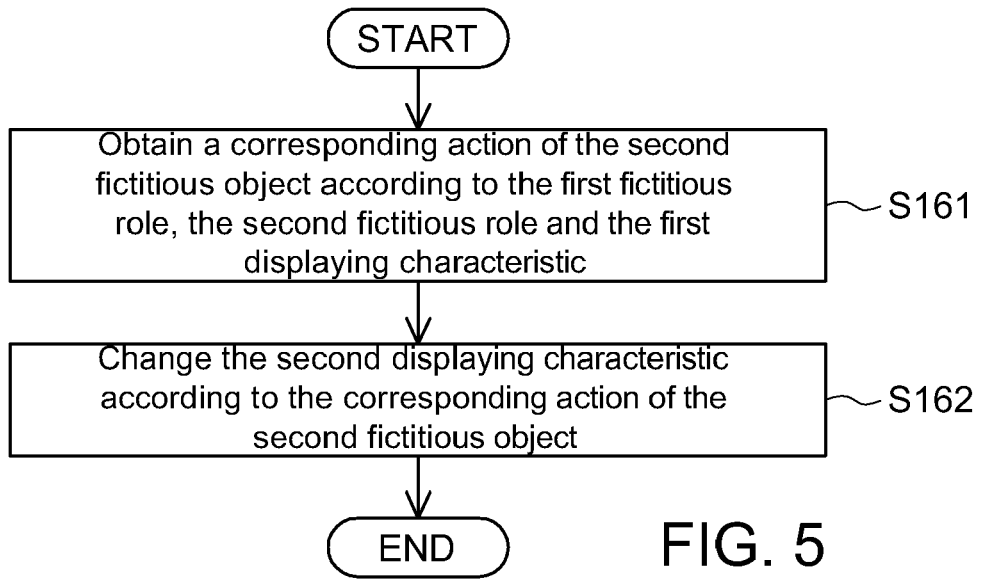
FIG. 5 is a detailed flow chart showing step S160 of FIG. 2.

FIG. 5 is a detailed flow chart showing the step S160 of FIG. 2. In this embodiment, the step S160 includes steps S161 and S162, and the second fictitious object is an infant. First, in the step S161, the control unit 140 obtains the corresponding action of the second fictitious object according to the first fictitious role, the second fictitious role and the first displaying characteristic.

Figure 6A:
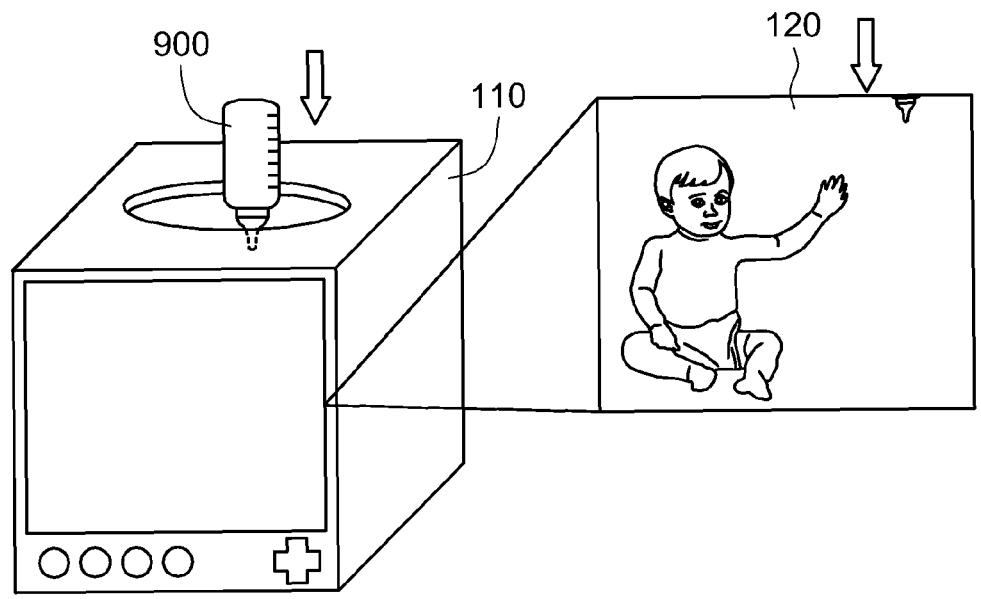
FIGS. 6A to 6C are schematic illustrations showing corresponding actions of the second fictitious object.
Figure 6B:
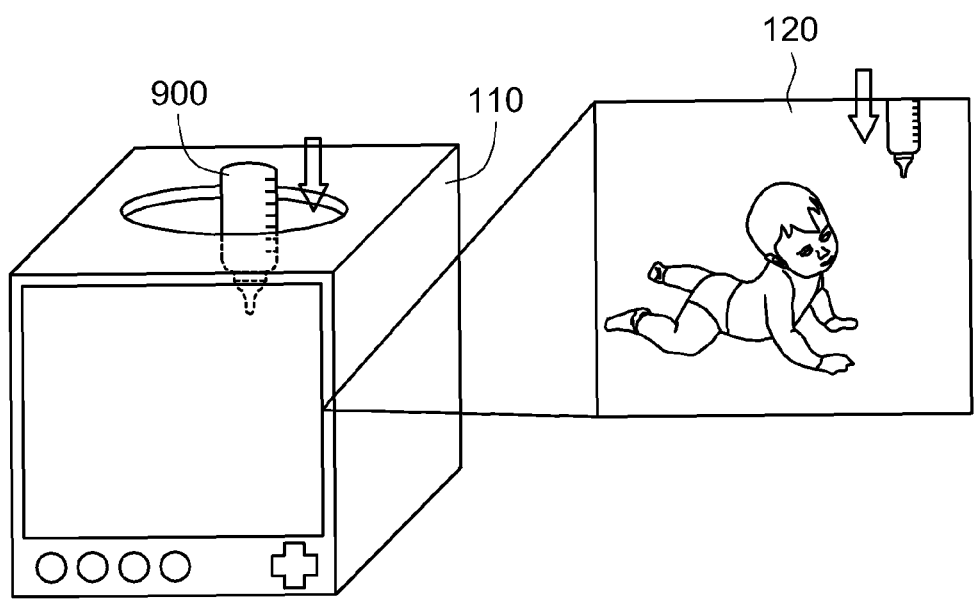
Figure 6C:
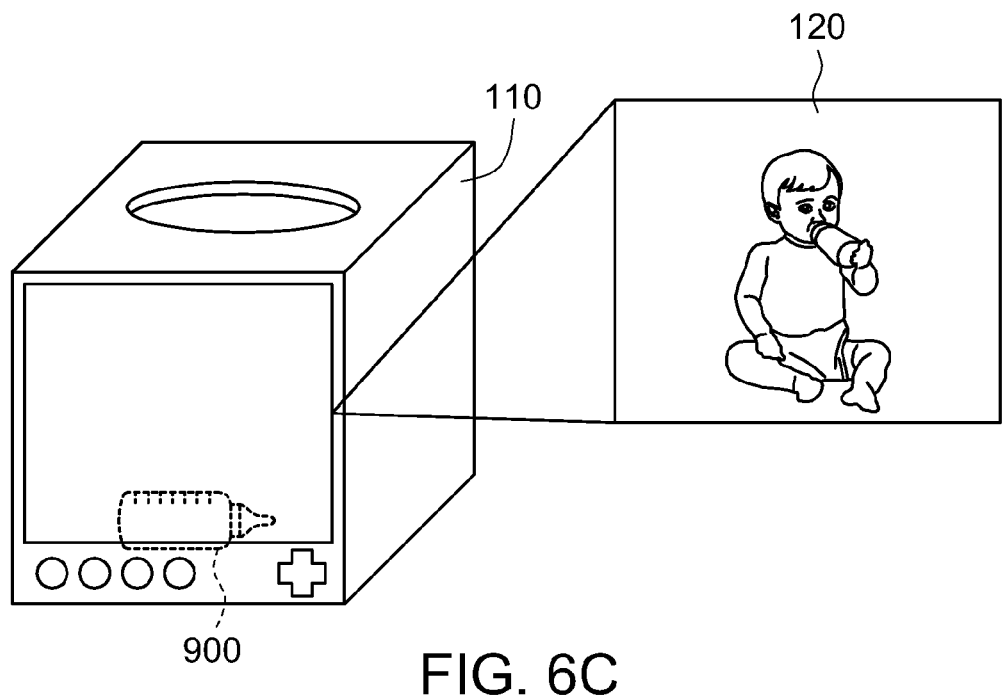

Next, in the step S162, the control unit 140 changes the second displaying characteristic according to the corresponding action of the second fictitious object. FIGS. 6A to 6C are schematic illustrations showing corresponding actions of the second fictitious object. For example, as shown in Table 2 and FIGS. 6A to 6C, when the first fictitious role is the feeding bottle and the first fictitious object is located near the right side of the frame, the control unit 140 changes the second displaying characteristic of the second fictitious object such that the infant pattern creeps toward the right side and chases the feeding bottle to take food.

TABLE 2

| | Real article | | Corresponding action of second fictitious object |
|---|---|---|---|
| 1 | First fictitious role<br>Space characteristic | Feeding bottle<br>Right side | Creep rightwards, and chase the feeding bottle to take food |
| 2 | First fictitious role<br>Space characteristic | Baby bear<br>Right side | Creep rightwards, and hold the baby bear to sleep |
| 3 | First fictitious role<br>Space characteristic | Clothes<br>Left side | Creep leftwards, and wear the clothes on |

In the computer system 100 and its controlling method according to the first embodiment of the invention, when the user is operating the real article 900, the first fictitious object on the frame and the real article 900 synchronously operate, and the real article 900 may directly interact with the second fictitious object on the frame such that the feeling of reality can be obtained. More particularly, when this embodiment is applied to the game product or the advertisement product, the interest may be enhanced.

Second Embodiment

Figure 7:
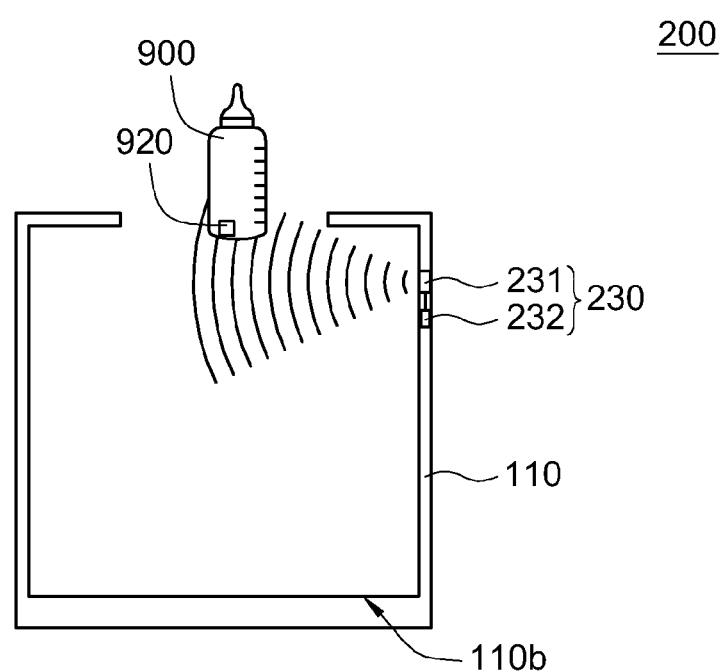
FIG. 7 is a schematic illustration showing a computer system according to a second embodiment of the invention.
Figure 8:
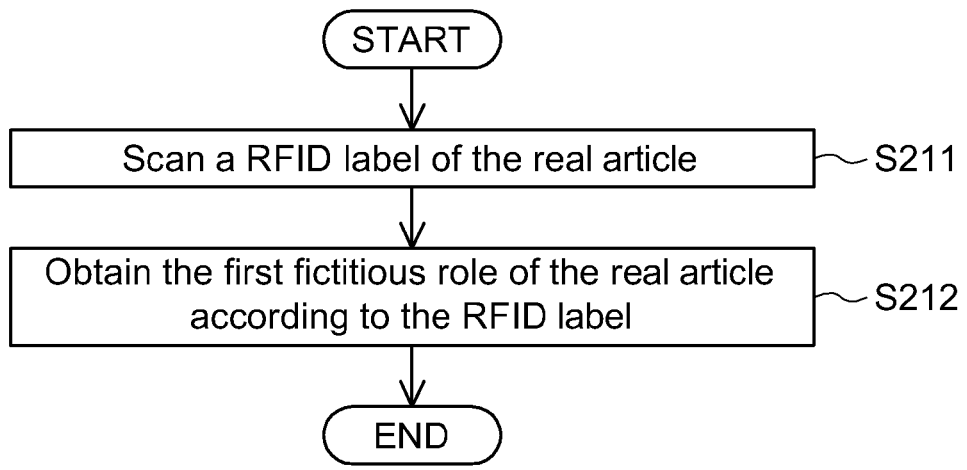
FIG. 8 is a detailed flow chart showing step S110 according to the second embodiment of the invention.

FIG. 7 is a schematic illustration showing a computer system 200 according to a second embodiment of the invention. FIG. 8 is a detailed flow chart showing the step S110 according to the second embodiment of the invention. As shown in FIGS. 7 and 8, it is obtained that the difference between the computer system 200 of the second embodiment and the computer system 100 of the first embodiment resides in a data unit 230 and the detailed flow of the step S110, and the details of the same other parts will be omitted.

In this embodiment, the real article 900 has a radio frequency identification (RFID) label 920, and the RFID label 920 is directly embedded into the real article 900. The data unit 230 includes a RFID scanner 231 and a RFID analyzer 232. The step S110 includes steps S211 and S212. In the step S211, when the real article 900 passes through the opening 110a, the RFID scanner 231 may scan the RFID label 920 of the real article 900.

Next, in the step S212, the RFID analyzer 232 again obtains the first fictitious role of the real article 900 according to the identification data of the RFID label 920. For example, the storage unit 150 has stored a look-up table of the identification data and the fictitious role in advance. The RFID analyzer 232 may determine the fictitious role, to which the identification data pertains, directly from the look-up table. If the suitable fictitious role cannot be found from the look-up table, it is also possible to directly define a new fictitious role.

Third Embodiment

Figure 9:
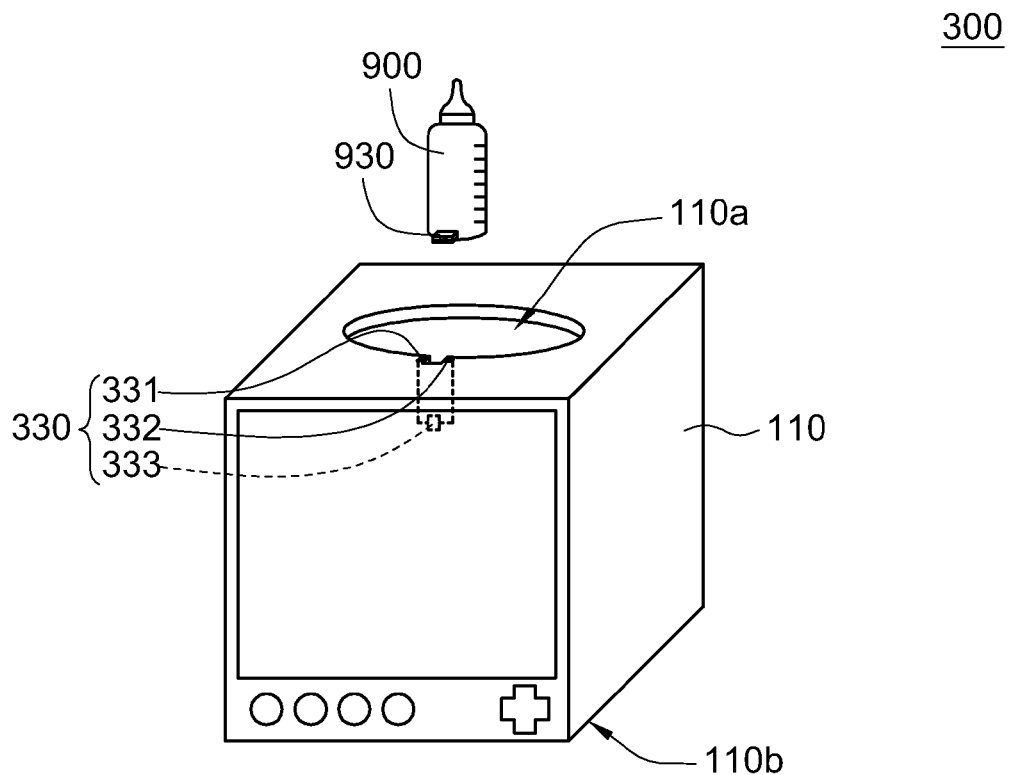
FIG. 9 is a schematic illustration showing a computer system according to a third embodiment of the invention.
Figure 10:
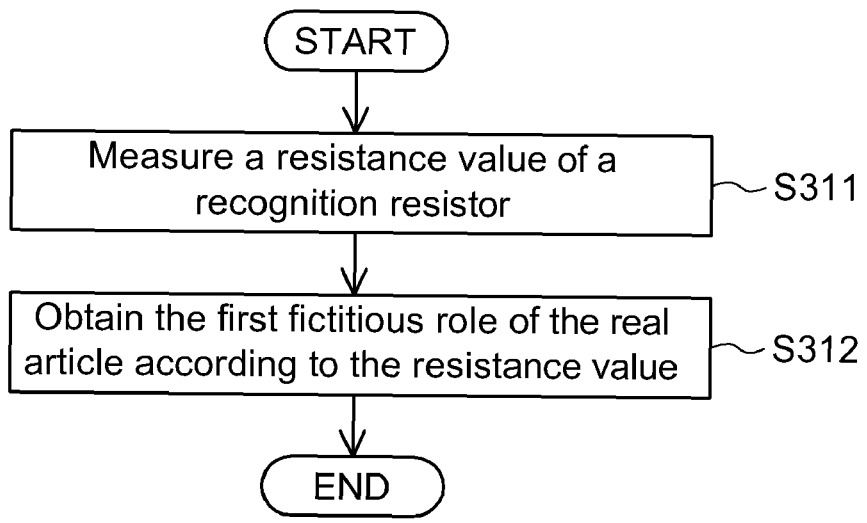
FIG. 10 is a detailed flow chart showing step S110 according to the third embodiment of the invention.

FIG. 9 is a schematic illustration showing a computer system 300 according to a third embodiment of the invention. FIG. 10 is a detailed flow chart showing the step S110 according to the third embodiment of the invention. The difference between the computer system 300 of the third embodiment and the computer system 100 of the first embodiment resides in a data unit 330 and the detailed flow of the step S110, and the details of the same other parts will be omitted.

In this embodiment, the real article 900 includes a recognition resistor 930, and the data unit 330 includes two electrical contactors 331 and 332 and a resistor analyzer 333. Different resistance values of the recognition resistor 930 represent different first fictitious roles. The step S110 includes steps S311 and S312. In the step S311, when the real article 900 passes through the opening 110a, the two electrical contactors 331 and 332 contact and measure a resistance value of the recognition resistor 930.

Next, in the step S312, the resistor analyzer 333 obtains the first fictitious role of the real article 900 according to the resistance value. For example, the storage unit 150 has stored the look-up table of the resistance value and the fictitious role in advance. The resistor analyzer 333 may determine the fictitious role, to which the measured resistance value pertains, directly from the look-up table. If the suitable fictitious role cannot be found from the look-up table, it is also possible to directly define a new fictitious role.

Fourth Embodiment

Figure 11A:
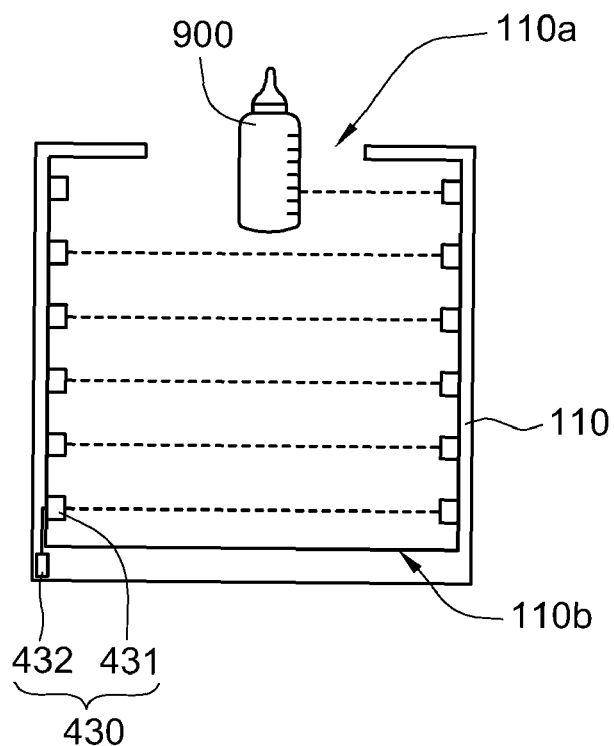
FIG. 11A is a schematic illustration showing a computer system according to a fourth embodiment of the invention.
Figure 11B:
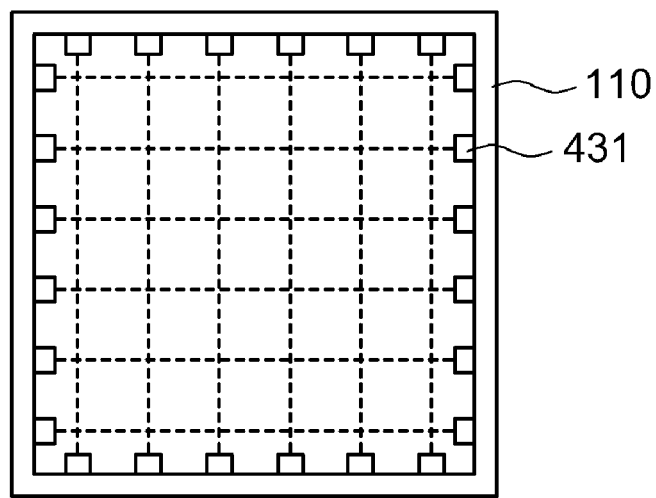
FIG. 11B is a top view showing a container and infrared generators.
Figure 12:
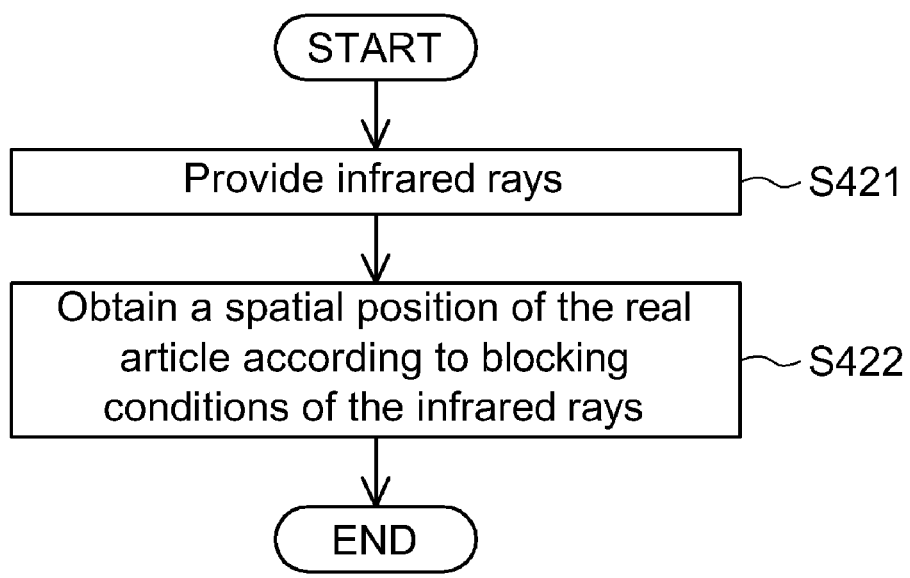
FIG. 12 is a detailed flow chart showing step S120 according to the fourth embodiment of the invention.

FIG. 11A is a schematic illustration showing a computer system 400 according to a fourth embodiment of the invention. FIG. 11B is a top view showing the container 110 and infrared generators 431. FIG. 12 is a detailed flow chart showing the step S120 according to the fourth embodiment of the invention. The difference between the computer system 400 of the fourth embodiment and the computer system 100 of the first embodiment resides in a data unit 430 and the detailed flow of the step S120, and the details of the same other parts will be omitted.

In this embodiment, the data unit 430 includes a plurality of infrared generators 431 and an infrared analyzer 432. The infrared generators 431 are distributed inside the container 110. The steps S121 to S123 of the first embodiment are replaced with steps S421 to S422 of this embodiment. First, in the step S421, when the real article 900 enters the container 110, the infrared generators 431 provide several infrared rays. As shown in FIG. 11A, the infrared generators 431 are distributed at different heights. As shown in FIG. 11B, the infrared generators 431 are distributed in a matrix at the same height.

Next, in the step S422, the infrared analyzer 432 obtains the spatial position of the real article 900 according to blocking conditions of the infrared rays.

Fifth Embodiment

Figure 13:
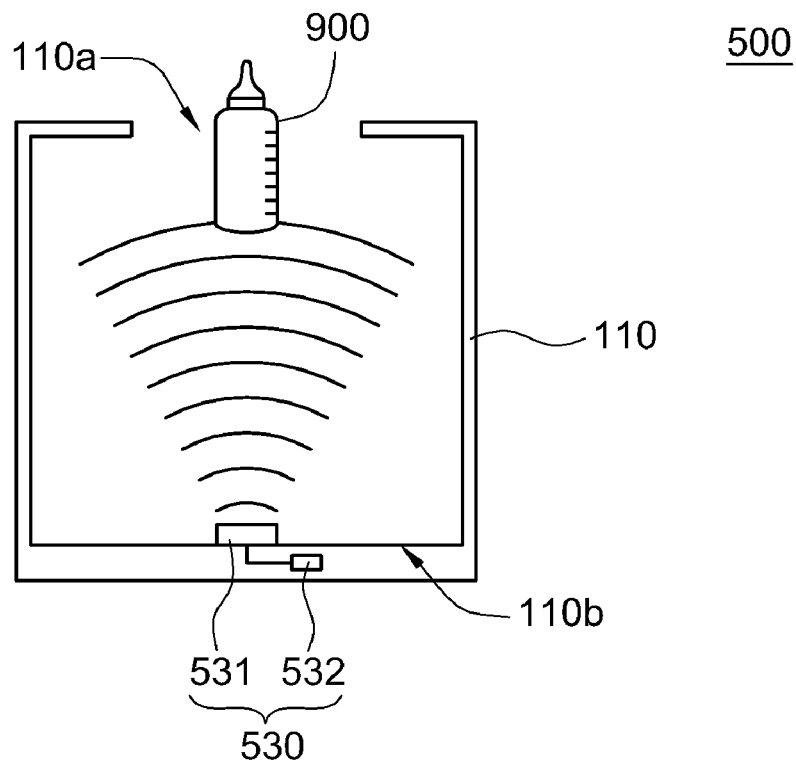
FIG. 13 is a schematic illustration showing a computer system according to a fifth embodiment of the invention.
Figure 14:
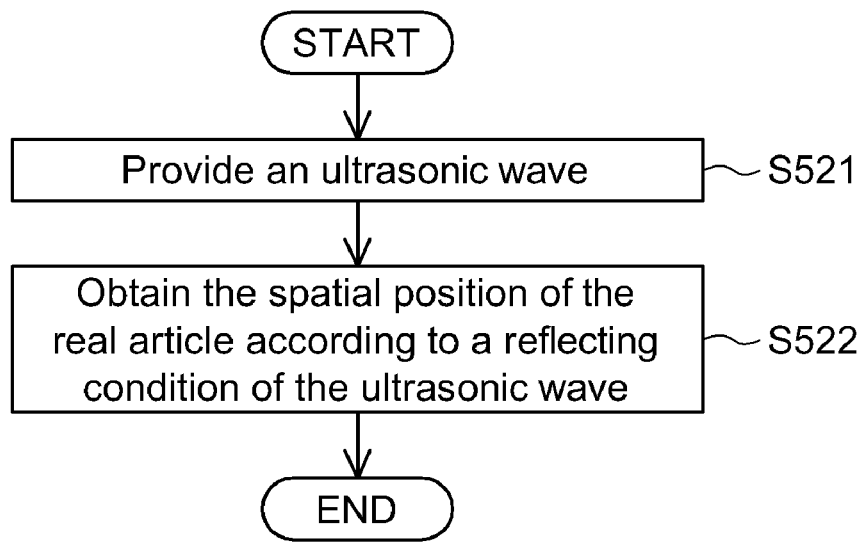
FIG. 14 is a detailed flow chart showing step S120 according to the fifth embodiment of the invention.

FIG. 13 is a schematic illustration showing a computer system 500 according to a fifth embodiment of the invention. FIG. 14 is a detailed flow chart showing the step S120 according to the fifth embodiment of the invention. The difference between the computer system 500 of the fifth embodiment and the computer system 100 of the first embodiment resides in a data unit 530 and the detailed flow of the step S120, and the details of the same other parts will be omitted.

In this embodiment, the data unit 530 includes an ultrasonic wave generator 531 and an ultrasonic wave analyzer 532. The steps S121 to S123 of the first embodiment are replaced with steps S521 to S522 of this embodiment. First, in the step S521, after the real article 900 enters the container 110, the ultrasonic wave generator 531 provides an ultrasonic wave.

Next, in the step S522, the ultrasonic wave analyzer 532 obtains the spatial position of the real article 900 according to a reflecting condition of the ultrasonic wave.

Sixth Embodiment

Figure 15:
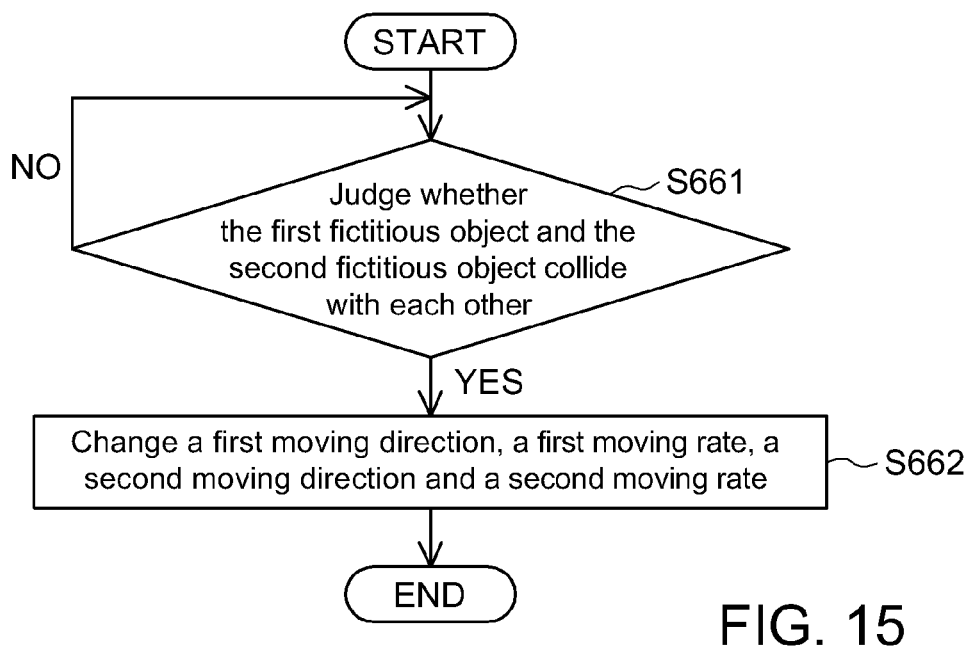
FIG. 15 is a detailed flow chart showing step S160 according to a sixth embodiment of the invention.

FIG. 15 is a detailed flow chart showing the step S160 according to a sixth embodiment of the invention. The difference between the computer system of the fifth embodiment and the computer system 100 of the first embodiment resides in the detailed flow of the step S160, and the details of the same other parts will be omitted.

In this embodiment, the first displaying characteristic includes the first displaying position, the first displaying size, the first moving direction and the first moving rate, and the second displaying characteristic includes a second displaying position, a second displaying size, a second moving direction and a second moving rate. The step S160 includes steps S661 and S662. The step S661 includes steps S6611 to S6614. In the step S661, the control unit 140 judges whether the first fictitious object and the second fictitious object collide with each other according to the first displaying position, the first displaying size, the second displaying position and the second displaying size. If the first fictitious object and the second fictitious object collide with each other, the procedure enters the step S662. If the first fictitious object and the second fictitious object do not collide with each other, the procedure goes back to the step S661.

Figure 16:
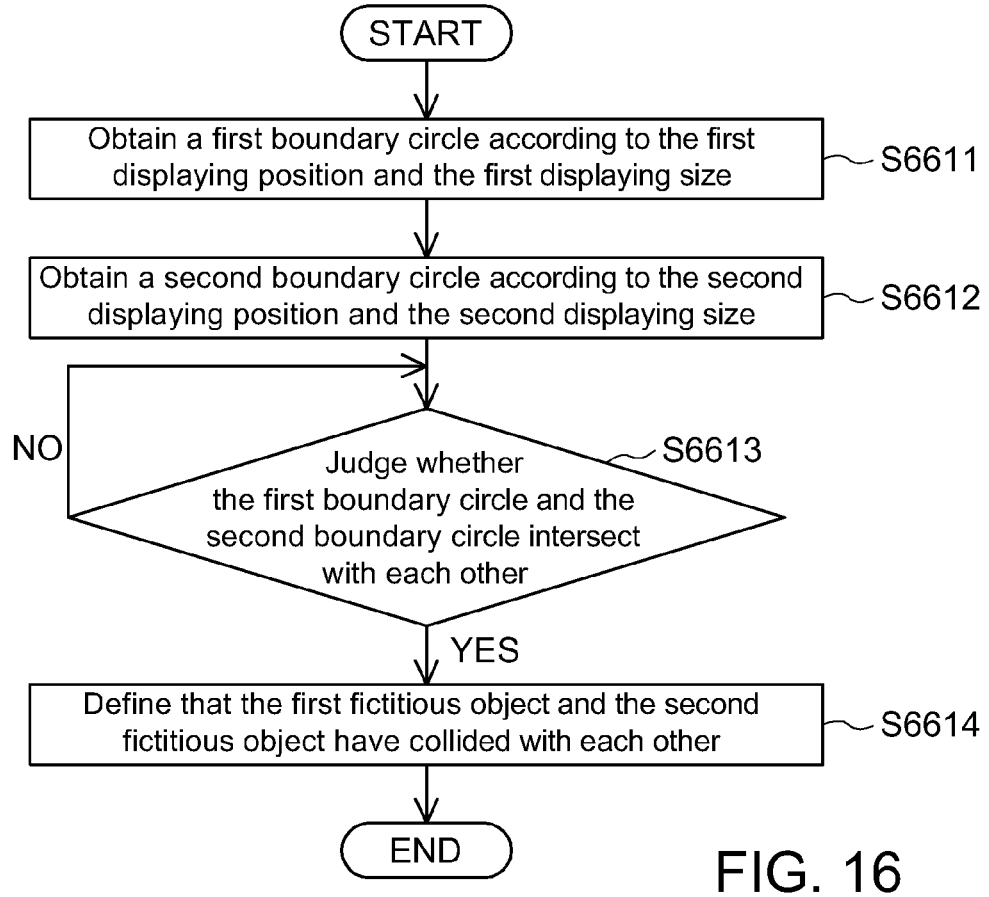
FIG. 16 is a detailed flow chart showing step S661 of FIG. 15.

FIG. 16 is a detailed flow chart showing the step S661 of FIG. 15. In this embodiment, the step S661 further includes several steps S6611 to S6614. First, in the step S6611, the control unit 140 obtains a first boundary circle according to the first displaying position and the first displaying size. The first boundary circle may be a circle entirely covering the first fictitious object.

Next, in the step S6612, the control unit 140 obtains a second boundary circle according to the second displaying position and the second displaying size. The second boundary circle may be a circle entirely covering the second fictitious object.

Then, in the step S6613, the control unit 140 judges whether the first boundary circle and the second boundary circle intersect with each other. If the first boundary circle and the second boundary circle intersect with each other, the procedure enters the step S6614. If the first boundary circle and the second boundary circle do not intersect with each other, the procedure goes back to the step S6613.

Next, in the step S6614, the control unit 140 defines that the first fictitious object and the second fictitious object have collided with each other.

In the step S662, the control unit 140 changes the first moving direction, the first moving rate, the second moving direction and the second moving rate according to the first moving direction, the first moving rate, the second moving direction and the second moving rate. For example, if the first moving direction and the second moving direction are substantially parallel to each other and directed to the same direction, the object (the first fictitious object or the second fictitious object) to be impacted is accelerated. Alternatively, when the first moving direction is not parallel to the second moving direction, the moving directions and the moving rates of the two objects (the first fictitious object and the second fictitious object) to be impacted are changed according to the computation result.

Seventh Embodiment

Figure 17:
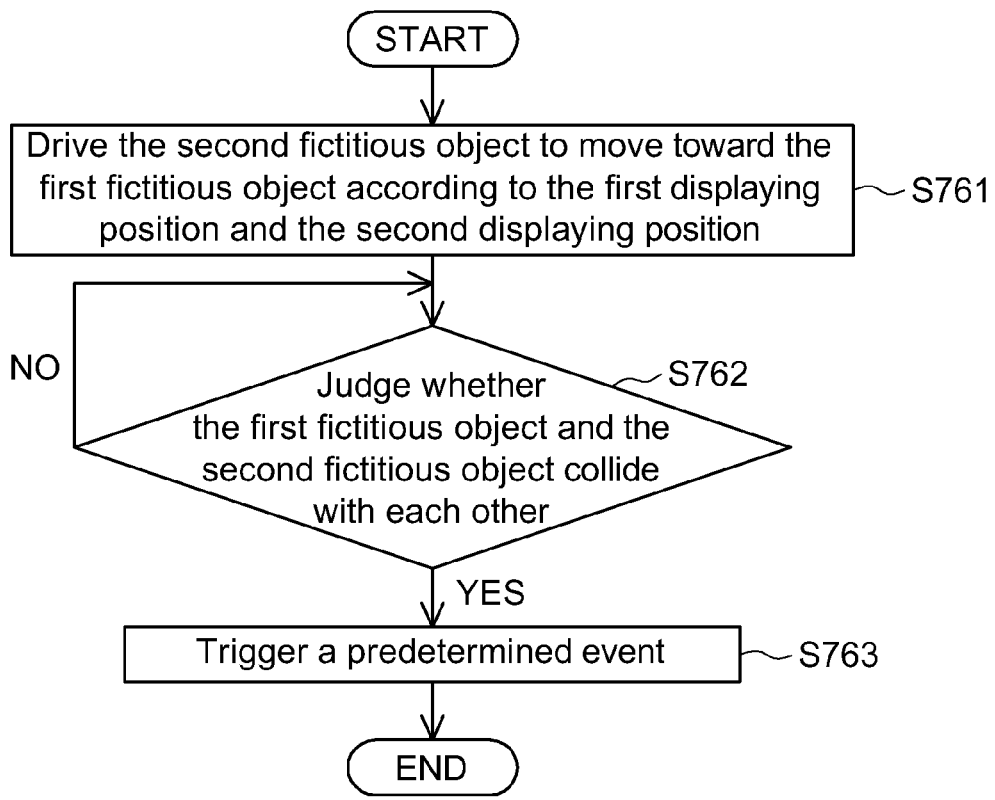
FIG. 17 is a detailed flow chart showing step S160 according to a seventh embodiment of the invention.

FIG. 17 is a detailed flow chart showing the step S160 according to a seventh embodiment of the invention. The difference between the computer system of the seventh embodiment and the computer system of the sixth embodiment resides in the detailed flow of the step S160, and the details of the same other parts will be omitted.

In this embodiment, the steps S161 and S162 of the first embodiment are replaced with steps S761 to S763, and the first fictitious object is, for example, a combination of a fishing line and a lure, and the second fictitious object is, for example, a goldfish. First, in the step S761, the control unit 140 drives the second fictitious object to move toward the first fictitious object according to the first displaying position and the second displaying position.

Next, in the step S762, the control unit 140 judges whether the first fictitious object and the second fictitious object collide with each other. If the first fictitious object and the second fictitious object collide with each other, the procedure enters the step S763. If the first fictitious object and the second fictitious object do not collide with each other, the procedure goes back to the step S762.

Then, in the step S763, if the first fictitious object and the second fictitious object collide with each other, a predetermined event is triggered. The predetermined object may be, for example, to fish up a goldfish when the goldfish touches a lure.

Eighth Embodiment

Figure 18:
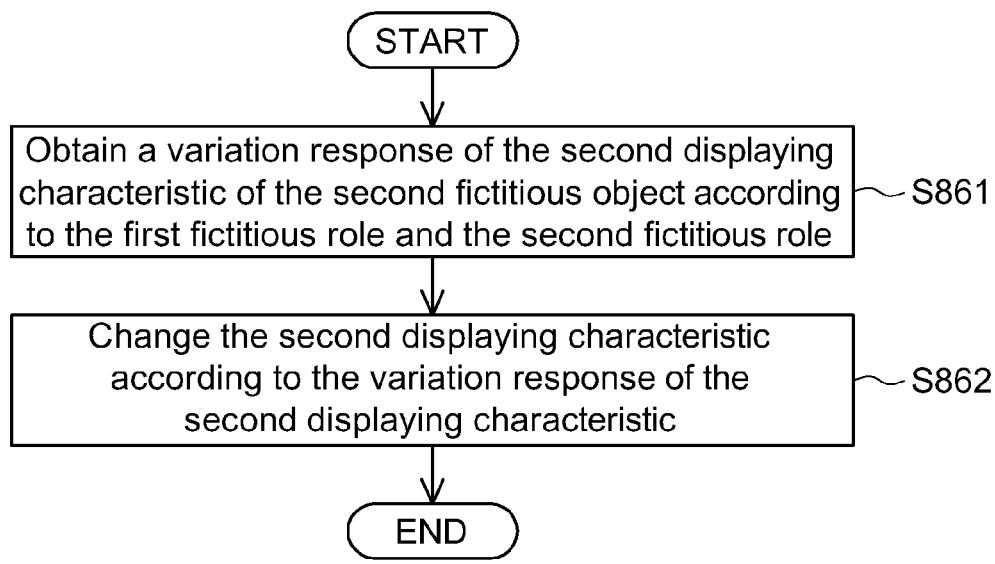
FIG. 18 is a detailed flow chart showing step S160 according to an eighth embodiment of the invention.

FIG. 18 is a detailed flow chart showing the step S160 according to an eighth embodiment of the invention. The difference between the computer system of the eighth embodiment and the computer system of the first embodiment resides in the detailed flow of the step S160, and the details of the same other parts will be omitted.

In this embodiment, the steps S161 and S162 of the first embodiment are replaced with steps S861 and S862, and the second fictitious object is an infant. First, in the step S861, the control unit 140 obtains the variation response of the second displaying characteristic of the second fictitious object according to the first fictitious role and the second fictitious role.

Next, the control unit 140 changes the second displaying characteristic according to the variation response of the second displaying characteristic. For example, as shown in Table 3, when the first fictitious role is a puppy, the moving rate of the infant pattern of the second fictitious object is increased by 1.5 times.

TABLE 3

| | Real article | | Variation response of second displaying characteristic |
|---|---|---|---|
| 1 | First fictitious role | Puppy | Moving rate is increased by 1.5 times |

TABLE 3-continued

| | Real article | | Variation response of second displaying characteristic |
|---|---|---|---|
| 2 | First fictitious role | Flower | Growing speed is increased by 1.1 times |
| 3 | First fictitious role | Infant | Weight of infant is increased by 100 grams |
| 4 | First fictitious role | Baddie | Strength is decreased by 1 unit, and the attacking strength is increased by 0.5 units |

Ninth Embodiment

Figure 19:
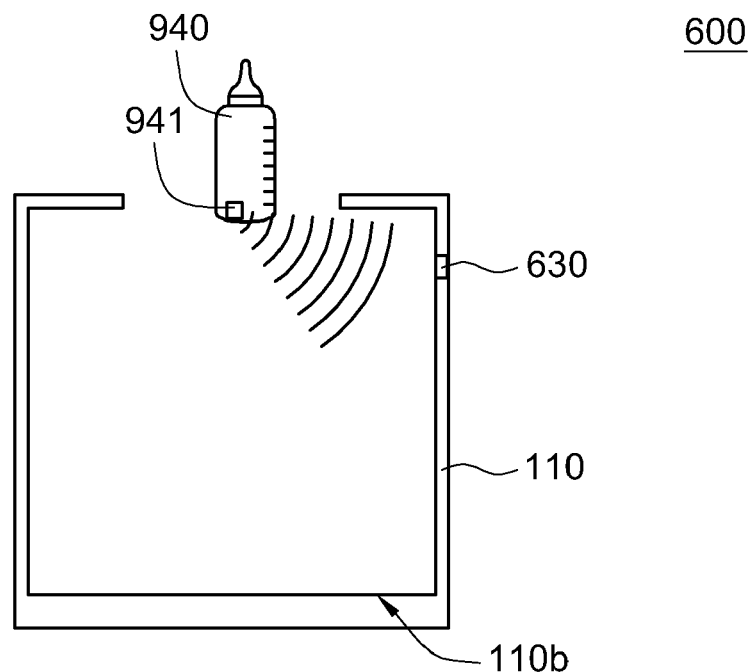
FIG. 19 is a schematic illustration showing a computer system and a real article according to a ninth embodiment of the invention.

FIG. 19 is a schematic illustration showing a computer system 600 and a real article 940 according to a ninth embodiment of the invention. The difference between the computer system 600 and the real article 940 of this embodiment and the computer system 100 and the real article 900 of the first embodiment resides in that the first fictitious role is actively transferred from a transmitting unit 941 of the real article 940 to a data unit 630, and the details of the same other parts will be omitted.

As shown in FIG. 19, the real article 940 has a first fictitious role. When the real article 940 enters the container 110, the transmitting unit 941 of the real article 940 actively transmits the first fictitious role to the data unit 630 of the computer system 600 through the wireless transmission.

Consequently, the user may change the favorite first fictitious role on the real article 940 very conveniently.

Tenth Embodiment

Figure 20:
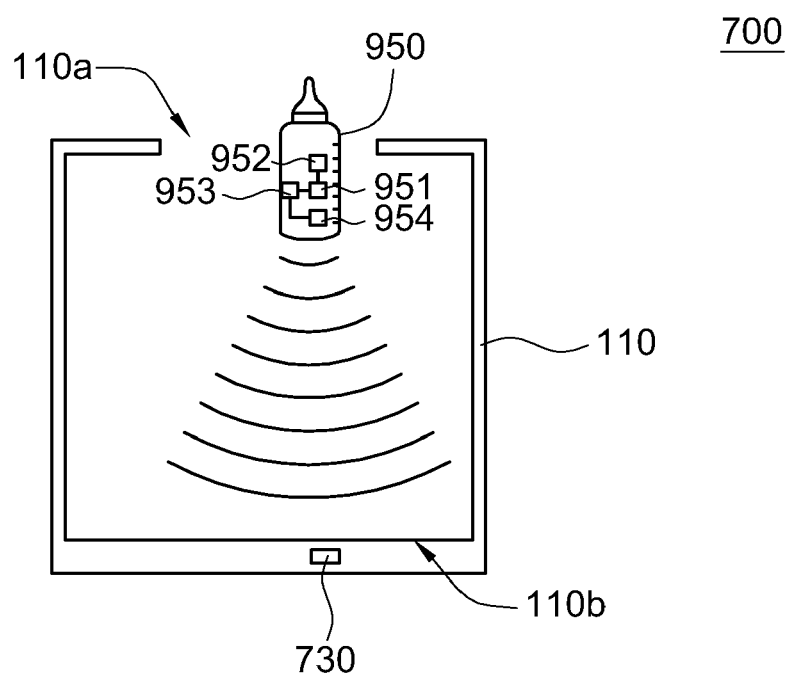
FIG. 20 is a schematic illustration showing a computer system and a real article according to a tenth embodiment of the invention.

FIG. 20 is a schematic illustration showing a computer system 700 and a real article 950 according to a tenth embodiment of the invention. The difference between the computer system 700 and the real article 950 of this embodiment and the computer system 100 and the real article 900 of the first embodiment resides that the space characteristic is actively transferred to a data unit 730 of the computer system 700 after being actively detected by the real article 950, and the details of the same other parts will be omitted.

Referring to FIG. 20, the real article 950 of this embodiment includes a gyroscope 951, an acceleration sensor 952, an operator 953 and a transmitting unit 954. When the real article 950 enters the opening 110a of the container 110, the gyroscope 951 and the acceleration sensor 952 are immediately zeroed. The operator 953 receives the measurement information of the gyroscope 951 and the acceleration sensor 952, and then analyzes the displacement of the real article 950. This displacement corresponds to the position and the rotation angle of the opening 110a of the container 110. Next, the transmitting unit 954 transmits the position and the rotation angle of the real article 950 relative to the opening 110a of the container 110 to the data unit 730 of the computer system 700.

The gyroscope 951 and the acceleration sensor 952 may be zeroed by setting a zeroing button on the real article 950, or may be automatically zeroed at the time instant when the transmitting unit 954 communicates with the data unit 730.

Eleventh Embodiment

Figure 21:
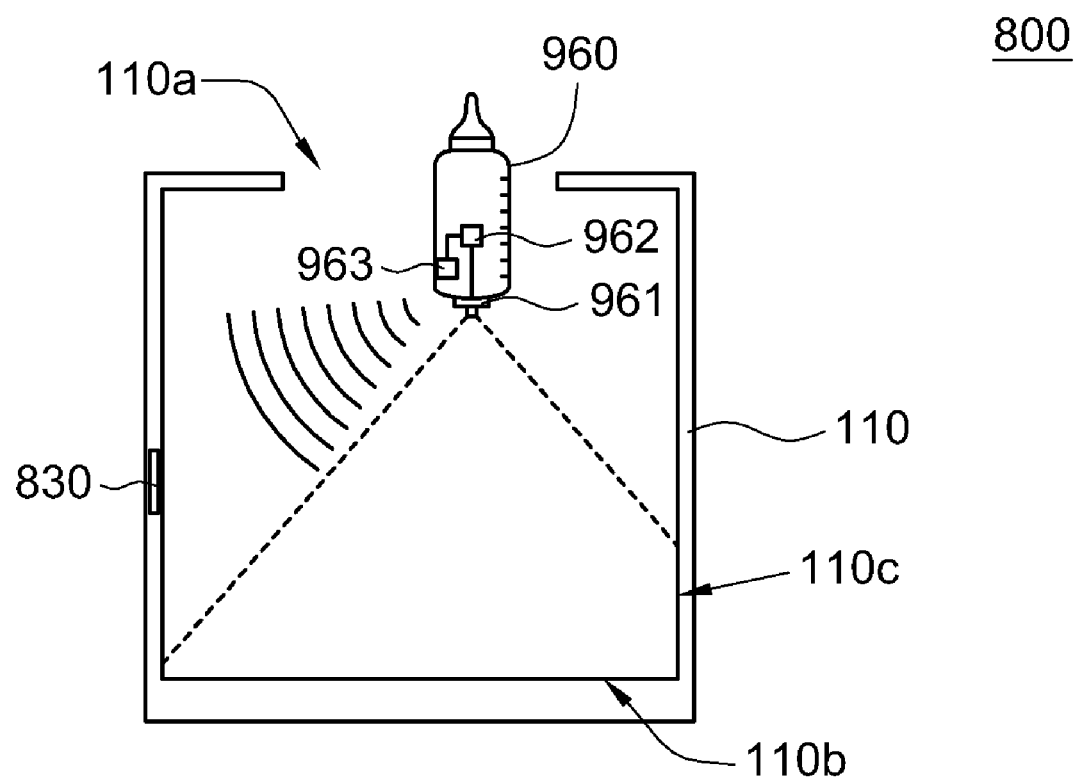
FIG. 21 is a schematic illustration showing a computer system and a real article according to an eleventh embodiment of the invention.

FIG. 21 is a schematic illustration showing a computer system 800 and a real article 960 according to an eleventh embodiment of the invention. The difference between the computer system 800 and the real article 960 of this embodiment and the computer system 100 and the real article 900 of the first embodiment resides in that the space characteristic is actively transferred to a data unit 830 of the computer system 800 after being actively detected by the real article 960, and the details of the same other parts will be omitted.

Referring to FIG. 21, the real article 960 of this embodiment includes an image capturer 961 and an image analyzer 962. The image capturer 961 captures a bottom image and a sidewall image of the container 110 from the real article 960 to the bottom 110b and the sidewall 110c of the container 110.

The image analyzer 962 obtains the height of the real article 960 relative to the bottom 110b according to the size of the bottom image.

In addition, the image analyzer 962 further obtains the horizontal position of the real article 960 relative to the bottom 110b according to the position of the bottom image relative to the sidewall image.

Furthermore, the image analyzer 962 may further obtain the rotation angle of the real article 960 according to a compared result between the bottom image and the sidewall image.

After the image analyzer 962 obtains the height, horizontal position and rotation angle of the real article 960 relative to the bottom 100b, the height, horizontal position and rotation angle may be transmitted to the data unit 830 of the computer system 800 through the transmitting unit.

In the computer system and its controlling method according to each embodiment of the invention, the computer system can completely respond to the position, size and angle of the real article in the fictitious frame by the detecting and controlling procedures, and the feeling of reality of the fictitious reality can be enhanced. In addition, the real article may also interact with the fictitious object displayed on the frame to increase a lot of interests.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A controlling method of a computer system, the computer system comprising a container and a display unit, the container having an opening communicating with a receiving space, through which a real article is placed entirely within the receiving space and enters the container, the display unit being for displaying a frame, the controlling method comprising the steps of:

obtaining a first fictitious role corresponding to the real article;

obtaining a space characteristic of the real article corresponding to the container, wherein the space characteristic includes the three-dimensional orientation of the real article with respect to the container;

obtaining a first displaying characteristic of the real article corresponding to the frame according to the first fictitious role and the space characteristic;

displaying a first fictitious object on the frame according to the first displaying characteristic;

wherein in the step of obtaining the space characteristic, the space characteristic is obtained by detecting the real article by the computer system; the space characteristic comprises a spatial position of the real article in the container; and the step of obtaining the space characteristic comprises:

providing a plurality of infrared rays; and obtaining the spatial position of the real article according to blocking conditions of the infrared rays.

2. The method according to claim 1, wherein in the step of obtaining the first fictitious role, the first fictitious role is actively transferred from the real article to the computer system.

3. The method according to claim 1, wherein in the step of obtaining the first fictitious role, the first fictitious role is obtained by recognizing the real article by the computer system.

4. The method according to claim 3, wherein the step of obtaining the first fictitious role comprises:
    capturing an article image of the real article; and
    obtaining the first fictitious role of the real article according to the article image.

5. The method according to claim 3, wherein the real article has a radio frequency identification (RFID) label, and the step of obtaining the first fictitious role comprises:
    scanning the RFID label of the real article; and
    obtaining the first fictitious role of the real article according to the RFID label.

6. The method according to claim 3, wherein the real article comprises a recognition resistor, and the step of obtaining the first fictitious role comprises:
    measuring a resistance value of the recognition resistor; and
    obtaining the first fictitious role of the real article according to the resistance value.

7. The method according to claim 1, wherein the step of obtaining the space characteristic comprises:
    capturing an article image of the real article from a bottom of the container; and
    obtaining a height of the real article relative to the bottom according to a size of the article image.

8. The method according to claim 1, wherein the step of obtaining the space characteristic comprises:
    capturing an article image of the real article and a background image of the opening from a bottom of the container; and
    obtaining a horizontal position of the real article relative to the bottom according to a position of the article image relative to the background image.

9. The method according to claim 1, wherein the step of obtaining the space characteristic comprises:
    providing an ultrasonic wave; and
    obtaining the spatial position of the real article according to a reflecting condition of the ultrasonic wave.

10. The method according to claim 1, wherein the space characteristic comprises a rotation angle of the real article.

11. The method according to claim 10, wherein the step of obtaining the space characteristic comprises:
    providing a plurality of reference images of the real article, wherein the reference images are captured at different angles;
    capturing an article image of the real article; and
    obtaining the rotation angle of the real article according to compared results between the article image and the reference images.

12. The method according to claim 10, wherein the real article comprises an acceleration sensor, and the step of obtaining the space characteristic comprises:
    detecting a variation of the acceleration sensor; and
    obtaining the rotation angle of the real article according to the variation of the acceleration sensor.

13. The method according to claim 1, wherein the frame further displays a second fictitious object corresponding to a second fictitious role, and the controlling method further comprises the steps of:
    providing a second displaying characteristic of the second fictitious object; and
    changing the first displaying characteristic or the second displaying characteristic according to the first fictitious role, the second fictitious role, the first displaying characteristic or the second displaying characteristic.

14. The method according to claim 13, wherein the first displaying characteristic comprises a first displaying position, a first displaying size, a first moving direction and a first moving rate, the second displaying characteristic comprises a second displaying position, a second displaying size, a second moving direction and a second moving rate, and the step of changing the first displaying characteristic or the second displaying characteristic comprises:
    judging whether the first fictitious object and the second fictitious object collide with each other according to the first displaying position, the first displaying size, the second displaying position and the second displaying size; and
    changing the first moving direction, the first moving rate, the second moving direction and the second moving rate according to the first moving direction, the first moving rate, the second moving direction and the second moving rate if the first fictitious object and the second fictitious object collide with each other.

15. The method according to claim 14, wherein the step of judging whether the first fictitious object and the second fictitious object collide with each other comprises:
    obtaining a first boundary circle according to the first displaying position and the first displaying size;
    obtaining a second boundary circle according to the second displaying position and the second displaying size;
    judging whether the first boundary circle and the second boundary circle intersect with each other; and
    defining that the first fictitious object and the second fictitious object collide with each other if the first boundary circle and the second boundary circle intersect with each other.

16. The method according to claim 13, wherein the step of changing the first displaying characteristic or the second displaying characteristic comprises:
    obtaining a corresponding action of the second fictitious object according to the first fictitious role, the second fictitious role and the first displaying characteristic; and
    changing the second displaying characteristic according to the corresponding action of the second fictitious object.

17. The method according to claim 13, wherein the first displaying characteristic comprises a first displaying position and a first displaying size, the second displaying characteristic comprises a second displaying position and a second displaying size, and the step of changing the first displaying characteristic or the second displaying characteristic comprises:
    driving the second fictitious object to move toward the first fictitious object according to the first displaying position and the second displaying position;
    judging whether the first fictitious object and the second fictitious object collide with each other according to the first displaying position, the first displaying size, the second displaying position and the second displaying size; and
    triggering a predetermined event if the first fictitious object and the second fictitious object collide with each other.

18. A computer system, comprising:
- a container having an opening communicating with a receiving space, through which a real article is placed entirely within the receiving space and enters the container;
- a display unit for displaying a frame;
- a data unit for obtaining a first fictitious role corresponding to the real article, and obtaining a space characteristic of the real article corresponding to the container, wherein the space characteristic includes the three-dimensional orientation of the real article with respect to the container;
- a control unit for obtaining a first displaying characteristic of the real article corresponding to the frame according to the first fictitious role and the space characteristic, and displaying a first fictitious object on the frame according to the first displaying characteristic;
- wherein the space characteristic is obtained by detecting the real article by the data unit, and the space characteristic comprises a spatial position of the real article in the container; and
- wherein the data unit comprises:
  - a plurality of infrared generators for providing a plurality of infrared rays; and
  - an infrared analyzer for obtaining the spatial position of the real article according to blocking conditions of the infrared rays.

19. The computer system according to claim 18, wherein the first fictitious role is actively transferred from the real article to the data unit.

20. The computer system according to claim 18, wherein the first fictitious role is obtained by recognizing the real article by the data unit.

21. The computer system according to claim 20, wherein the data unit comprises:
- an image capturer for capturing an article image of the real article; and
- an image analyzer for obtaining the first fictitious role of the real article according to the article image.

22. The computer system according to claim 20, wherein the real article has a radio frequency identification (RFID) label, and the data unit comprises:
- a RFID scanner for scanning the RFID label of the real article; and
- a RFID analyzer for obtaining the first fictitious role of the real article according to the RFID label.

23. The computer system according to claim 20, wherein the real article comprises a recognition resistor, and the data unit comprises:
- two electrical contactors for contacting and measuring a resistance value of the recognition resistor; and
- a resistor analyzer for obtaining the first fictitious role of the real article according to the resistance value.

24. The computer system according to claim 18, wherein the data unit comprises:
- an image capturer for capturing an article image of the real article from a bottom of the container; and
- an image analyzer for obtaining a height of the real article relative to the bottom according to a size of the article image.

25. The computer system according to claim 18, wherein the data unit comprises:
- an image capturer for capturing an article image of the real article and a background image of the opening from a bottom of the container; and
- an image analyzer for obtaining a horizontal position of the real article relative to the bottom according to a position of the article image relative to the background image.

26. The computer system according to claim 18, wherein the data unit comprises:
- an ultrasonic wave generator for providing an ultrasonic wave; and
- an ultrasonic wave analyzer for obtaining the spatial position of the real article according to a reflecting condition of the ultrasonic wave.

27. The computer system according to claim 18, wherein the space characteristic comprises a rotation angle of the real article.

28. The computer system according to claim 27, further comprising a storage unit for storing a plurality of reference images of the real article, wherein the reference images are acquired at different angles and the data unit comprises:
- an image capturer for capturing an article image of the real article; and
- an image analyzer for obtaining the rotation angle of the real article according to compared results between the article image and the reference images.

29. The computer system according to claim 27, wherein the real article comprises an acceleration sensor and a wireless transmitter, and the data unit comprises:
- a wireless receiver for receiving a variation of the acceleration sensor; and
- an acceleration analyzer for obtaining the rotation angle of the real article according to the variation of the acceleration sensor.

30. The computer system according to claim 18, wherein the frame further displays a second fictitious object, which corresponds to a second fictitious role and has a second displaying characteristic, and the control unit changes the first displaying characteristic or the second displaying characteristic according to the first fictitious role, the second fictitious role, the first displaying characteristic or the second displaying characteristic.

31. The computer system according to claim 30, wherein:
- the first displaying characteristic comprises a first displaying position, a first displaying size, a first moving direction and a first moving rate;
- the second displaying characteristic comprises a second displaying position, a second displaying size, a second moving direction and a second moving rate;
- the control unit judges whether the first fictitious object and the second fictitious object collide with each other according to the first displaying position, the first displaying size, the second displaying position and the second displaying size, and
- the control unit changes the first moving direction, the first moving rate, the second moving direction and the second moving rate according to the first moving direction, the first moving rate, the second moving direction and the second moving rate if the first fictitious object and the second fictitious object collide with each other.

32. The computer system according to claim 31, wherein the control unit obtains a first boundary circle according to the first displaying position and the first displaying size, obtains a second boundary circle according to the second displaying position and the second displaying size, judges whether the first boundary circle and the second boundary circle intersect with each other, and defines that the first fictitious object and the second fictitious object have collided with each other if the first boundary circle and the second boundary circle intersect with each other.

33. The computer system according to claim 30, wherein the control unit obtains a corresponding action of the second fictitious object according to the first fictitious role, the second fictitious role and the first displaying characteristic, and changes the second displaying characteristic according to the corresponding action of the second fictitious object.

34. The computer system according to claim 30, wherein:
the first displaying characteristic comprises a first displaying position and a first displaying size;
the second displaying characteristic comprises a second displaying position and a second displaying size; and
the control unit drives the second fictitious object to move toward the first fictitious object according to the first displaying position and the second displaying position, judges whether the first fictitious object and the second fictitious object collide with each other according to the first displaying position, the first displaying size, the second displaying position and the second displaying size, and triggers a predetermined event if the first fictitious object and the second fictitious object collide with each other.

* * * * *